(12) United States Patent
Barlier et al.

(10) Patent No.: US 7,734,367 B2
(45) Date of Patent: Jun. 8, 2010

(54) METHOD OF OPTIMIZING THE JOINTS BETWEEN LAYERS IN MODELLING OR PROTOTYPING INVOLVING LAYER DECOMPOSITION, AND THE PARTS OBTAINED

(75) Inventors: Claude Barlier, Coinches (FR); Benoît Delebecque, Saint Die des Vosges (FR); Denis Cunin, Les Poulieres (FR)

(73) Assignee: Cirtes SRC, S.A. Coop, Saint Die (FR)

( * ) Notice: Subject to any disclaimer, the term of this patent is extended or adjusted under 35 U.S.C. 154(b) by 264 days.

(21) Appl. No.: 10/544,823

(22) PCT Filed: Feb. 6, 2003

(86) PCT No.: PCT/FR03/00367

§ 371 (c)(1),
(2), (4) Date: Aug. 5, 2005

(87) PCT Pub. No.: WO2004/079463

PCT Pub. Date: Sep. 16, 2004

(65) Prior Publication Data

US 2006/0142884 A1    Jun. 29, 2006

(51) Int. Cl.
*G06F 19/00* (2006.01)
*B29C 45/00* (2006.01)
(52) U.S. Cl. .................. 700/119; 700/182; 264/510
(58) Field of Classification Search .......... 700/98, 700/118, 119, 182; 264/510
See application file for complete search history.

(56) References Cited

U.S. PATENT DOCUMENTS

| 2,428,658 | A | 10/1947 | Falk et al. |
| 2,477,060 | A | 7/1949 | Hudak |
| 2,479,191 | A | 8/1949 | Williams et al. |
| 2,615,111 | A | 10/1952 | Paquette et al. |
| 3,039,146 | A | 6/1962 | Engel |
| 3,369,272 | A | 2/1968 | Martin, Jr. et al. |
| 3,612,387 | A | 10/1971 | Rathbun |
| 3,790,152 | A | 2/1974 | Parsons |

(Continued)

FOREIGN PATENT DOCUMENTS

DE    3711470    10/1988

(Continued)

OTHER PUBLICATIONS

Bocking et al., "Electrochemical Routes for Engineering Tool Production", The GEC Journal of Technology, vol. 14, No. 2, pp. 66 to 74 (1997).

(Continued)

*Primary Examiner*—Sean P Shechtman
(74) *Attorney, Agent, or Firm*—Gary M. Cohen

(57) ABSTRACT

In a method for optimizing the joints between layers along portions of the layers which are flush with the surface of a part obtained by computer-aided modeling or prototyping involving layer decomposition, the connecting profile of two successive layers is mathematically and numerically defined using an algorithm in which the surface of the joint at the end zone adjacent to the flush portions is always substantially normal to the plane tangential to the surface of the part along the flush portions.

32 Claims, 8 Drawing Sheets

U.S. PATENT DOCUMENTS

| | | | |
|---|---|---|---|
| 3,909,582 A | 9/1975 | Bowen | |
| 3,932,923 A | 1/1976 | DiMatteo | |
| 4,001,069 A | 1/1977 | DiMatteo | |
| 4,250,727 A | 2/1981 | Baril et al. | |
| 4,338,068 A | 7/1982 | Suh et al. | |
| 4,586,690 A | 5/1986 | Härtel et al. | |
| 4,601,652 A | 7/1986 | Ando et al. | |
| 4,675,825 A | 6/1987 | DeMenthon | |
| 4,752,352 A | 6/1988 | Feygin | |
| 4,778,557 A | 10/1988 | Schirmer | |
| 4,781,555 A | 11/1988 | Cook | |
| 5,015,312 A | 5/1991 | Kinzie | |
| 5,031,483 A | 7/1991 | Weaver | |
| 5,354,414 A | 10/1994 | Feygin | |
| 5,514,232 A | 5/1996 | Burns | |
| 5,663,883 A | 9/1997 | Thomas et al. | |
| 5,725,891 A | 3/1998 | Reid, Jr. | |
| 5,765,137 A | 6/1998 | Lee | |
| 5,775,402 A | 7/1998 | Sachs et al. | |
| 5,776,409 A | 7/1998 | Almquist et al. | |
| 5,793,015 A | 8/1998 | Walczyk | |
| 5,812,402 A | 9/1998 | Makiuchi et al. | |
| 5,847,958 A | 12/1998 | Shaikh et al. | |
| 5,943,240 A | 8/1999 | Nakamura | |
| 6,021,358 A * | 2/2000 | Sachs | 700/98 |
| 6,110,409 A | 8/2000 | Allanic et al. | |
| 6,136,132 A | 10/2000 | Kinzie | |
| 6,164,115 A | 12/2000 | Higuchi et al. | |
| 6,276,656 B1 | 8/2001 | Baresich | |
| 6,284,182 B1 | 9/2001 | McNally | |
| 6,324,438 B1 * | 11/2001 | Cormier et al. | 700/118 |
| 6,344,160 B1 | 2/2002 | Holtzberg | |
| 6,358,029 B1 | 3/2002 | Niimi | |
| 6,405,095 B1 | 6/2002 | Jang et al. | |
| 6,409,902 B1 | 6/2002 | Yang et al. | |
| 6,454,924 B2 | 9/2002 | Jedrzejewski et al. | |
| 6,544,024 B1 | 4/2003 | Yim | |
| 6,554,882 B1 | 4/2003 | Zhou et al. | |
| 6,617,601 B1 | 9/2003 | Wiklund | |
| 6,627,030 B2 | 9/2003 | Yang et al. | |
| 6,627,835 B1 * | 9/2003 | Chung et al. | 219/69.12 |
| 6,688,871 B1 | 2/2004 | Lee et al. | |
| 6,719,554 B2 | 4/2004 | Hobson | |
| 6,728,591 B1 * | 4/2004 | Hussey et al. | 700/121 |
| 6,745,446 B1 | 6/2004 | Barlier | |
| 6,756,309 B1 * | 6/2004 | Chen et al. | 438/692 |
| 6,921,068 B2 | 7/2005 | Barlier et al. | |
| 6,991,021 B2 | 1/2006 | Ramirez et al. | |
| 7,003,864 B2 | 2/2006 | Dirscherl | |
| 2002/0125613 A1 | 9/2002 | Cominsky | |
| 2002/0149137 A1 | 10/2002 | Jang et al. | |
| 2002/0162940 A1 | 11/2002 | Frul et al. | |
| 2002/0165634 A1 | 11/2002 | Skszek | |
| 2003/0006001 A1 | 1/2003 | Yang et al. | |
| 2003/0122277 A1 | 7/2003 | Padovani | |
| 2003/0141609 A1 | 7/2003 | Jia | |
| 2004/0173930 A1 | 9/2004 | Himmer et al. | |
| 2004/0173951 A1 | 9/2004 | Hobson | |
| 2004/0217497 A1 | 11/2004 | Engwall et al. | |

FOREIGN PATENT DOCUMENTS

| | | |
|---|---|---|
| DE | 4041105 | 6/1992 |
| EP | 0585502 | 3/1994 |
| EP | 0606627 | 7/1994 |
| EP | 0655317 | 5/1995 |
| EP | 0655668 | 5/1995 |
| EP | 0738583 | 10/1996 |
| EP | 0763417 | 3/1997 |
| EP | 0811457 | 12/1997 |
| EP | 0620946 | 6/1999 |
| FR | 2233137 | 1/1975 |
| FR | 2625135 | 6/1989 |
| FR | 2673302 | 8/1992 |
| FR | 2750064 | 12/1997 |
| FR | 2789187 | 8/2000 |
| FR | 2789188 | 8/2000 |
| FR | 2808896 | 11/2001 |
| FR | 2809040 | 11/2001 |
| FR | 2834803 | 7/2003 |
| FR | 2834803 B1 * | 2/2004 |
| FR | 2845492 | 4/2004 |
| GB | 2011814 | 7/1979 |
| WO | WO/9112120 | 8/1991 |
| WO | WO/9508416 | 3/1995 |
| WO | WO/9900234 | 1/1999 |
| WO | WO 9911832 | 3/1999 |
| WO | WO/0222341 | 3/2002 |

OTHER PUBLICATIONS

T. Himmer, et al., "Lamination of Metal Sheets", Computers in Industry, Elsevier Science Publishers, Amsterdam, Netherlands, vol. 39, No. 1, pp. 27-33 (Jun. 1999).

Patent Abstracts of Japan, vol. 016, No. 370 (M-1292) Published: Aug. 10, 1992 (pertaining to JP 04 118221 (Fujitsu Ltd.), published Apr. 20, 1992).

Patent Abstracts of Japan, vol. 1995, No. 11 Published: Dec. 26, 1995 (pertaining to JP 07 214274 (U Mold:KK), published Aug. 15, 1995).

T. Polito, "Comment Optimiser le Moulage des Plastiques", ("How to Optimize the Molding of Plastics"), Emballages Magazine, Jan.-Feb. 2002, Supplement No. 605, pp. 56 and 57.

Choi et al, "Design and Evaluation of a Laser-Cutting Robot for Laminated, Solid Freeform Fabrication", Proceedings of the 2000 IEEE International Conference on Robotics & Automation, San Francisco, CA (Apr. 2000).

* cited by examiner

METHOD OF OPTIMIZING THE JOINTS BETWEEN LAYERS IN MODELLING OR PROTOTYPING INVOLVING LAYER DECOMPOSITION, AND THE PARTS OBTAINED

BACKGROUND OF THE INVENTION

The present invention relates to a method for optimizing the joints between layers along portions of the layers which are flush with the surface of a part obtained by computer-aided modeling or prototyping involving layer decomposition, as well as the elementary layers obtained by the method, and the parts resulting from their assembly.

Rapid prototyping methods are themselves known. For example, European Patent No. 0 585 502-B1 discloses a prototype part which is produced using software for decomposing the part to be produced into elementary layers. The layers are assembled together, and the final assembly is then externally reworked, in particular, to remove any roughnesses or imperfections resulting from assembly.

FIGS. 3 and 4 schematically show an assembly of layers which illustrate the problem encountered. In the illustrated assembly of two layers (1, 2), a portion of the joint (3) becomes externally flush, at (4). It will be understood that the zone (5) of the layer (1) comprises little material at this location, which, by machining and polishing, can result in the removal of material from the zone (5) of the joint (3), as is schematically shown in FIG. 4, at (6). This results in an imperfect part, with an irregular surface, which is unsatisfactory for certain applications.

Such conventional joints also have other disadvantages including poor strength, poor resistance to machining, poor resistance to mechanical stresses during use (in particular, compressive stresses, whether they be of mechanical or fluidic origin), poor resistance to all assembly operations (bonding, welding, cementing), and possible deformations during machining, during handling and during assembly.

SUMMARY OF THE INVENTION

In accordance with the present invention, these disadvantages are remedied by providing a method for optimizing the joints between layers along portions of the layers which are flush with the surface of a part obtained by computer-aided modeling or prototyping involving layer decomposition. In this method, the connecting profile of two successive layers is mathematically and numerically defined using an algorithm in which the surface of the joint at the end zone adjacent to the flush portions is always substantially normal to the plane tangential to the surface along the flush portions.

A further understanding of the present invention is provided in the description of alternative embodiments given below, with reference to the following drawings.

DETAILED DESCRIPTION OF PREFERRED EMBODIMENTS

Figure 3:
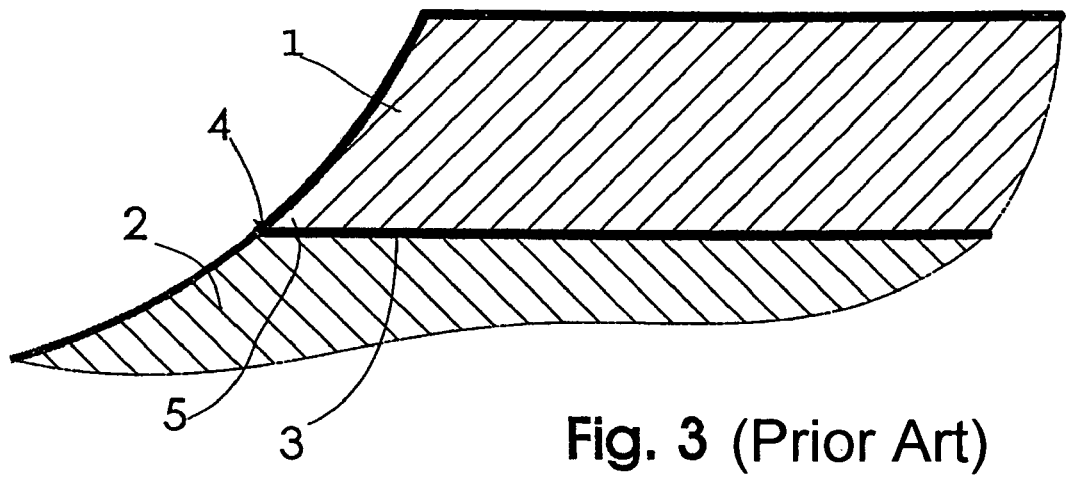
FIGS. 3 and 4 illustrate the problems potentially encountered with the layers of the prior art.
Figure 4:
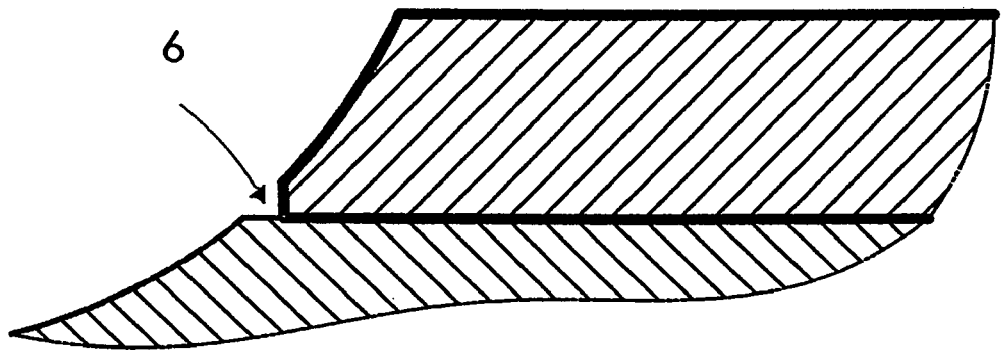
Figure 5:
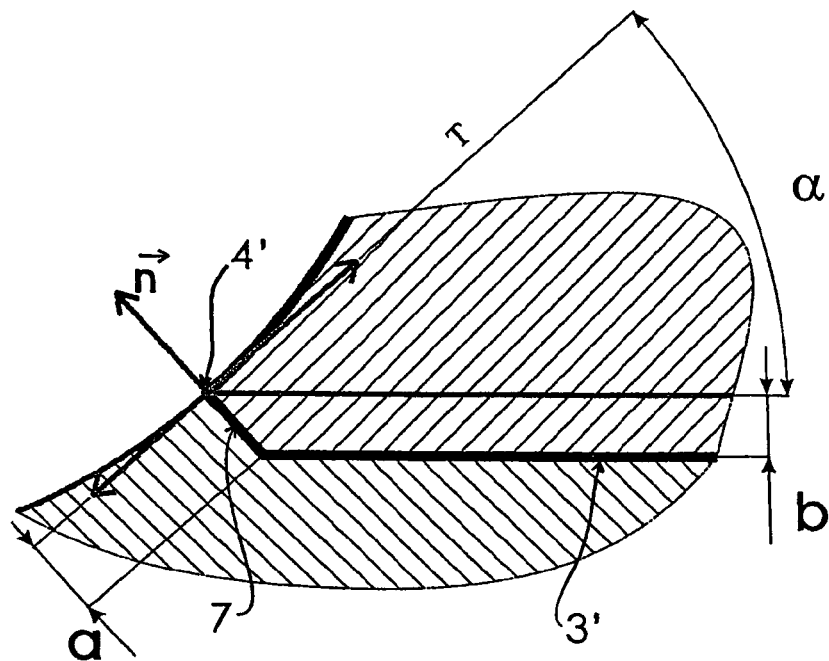
FIGS. 5 and 6 schematically illustrate the operating principle of the method of the present invention.

Referring first to FIG. 5 of the drawings, the essential parameters of a joint obtained in accordance with the method of the present invention include an angle ($\alpha$) between the tangent and the plane of a layer, a length (a) of a portion (7) of the joint (3') (corresponding to portions of the joint (3) between the adjacent layers shown in FIG. 3) which forms a profile connecting the two adjacent layers, an offset (b) of the plane of the layer, and a normal ($\vec{n}$) at the junction point (4'). In accordance with the present invention, the joint portion (7) is normal to the tangential plane (T) over a length (a). Note that if (a) is constant, (b) is f($\alpha$), and if $\alpha=\pi/2$, b=0.

The above-discussed problems associated with a joint of this type are solved as a result; however, the layers obtained through such a calculation will be of variable thickness. In addition, the profile of the layer can vary all along the periphery, and the line of the joint (portions of which are formed at an incline in FIG. 5) is not necessarily in one and the same plane. For angles ($\alpha$) close to $\pi/2$, it will also be necessary to suitably position the layers relative to one another, as explained below.

Figure 6:
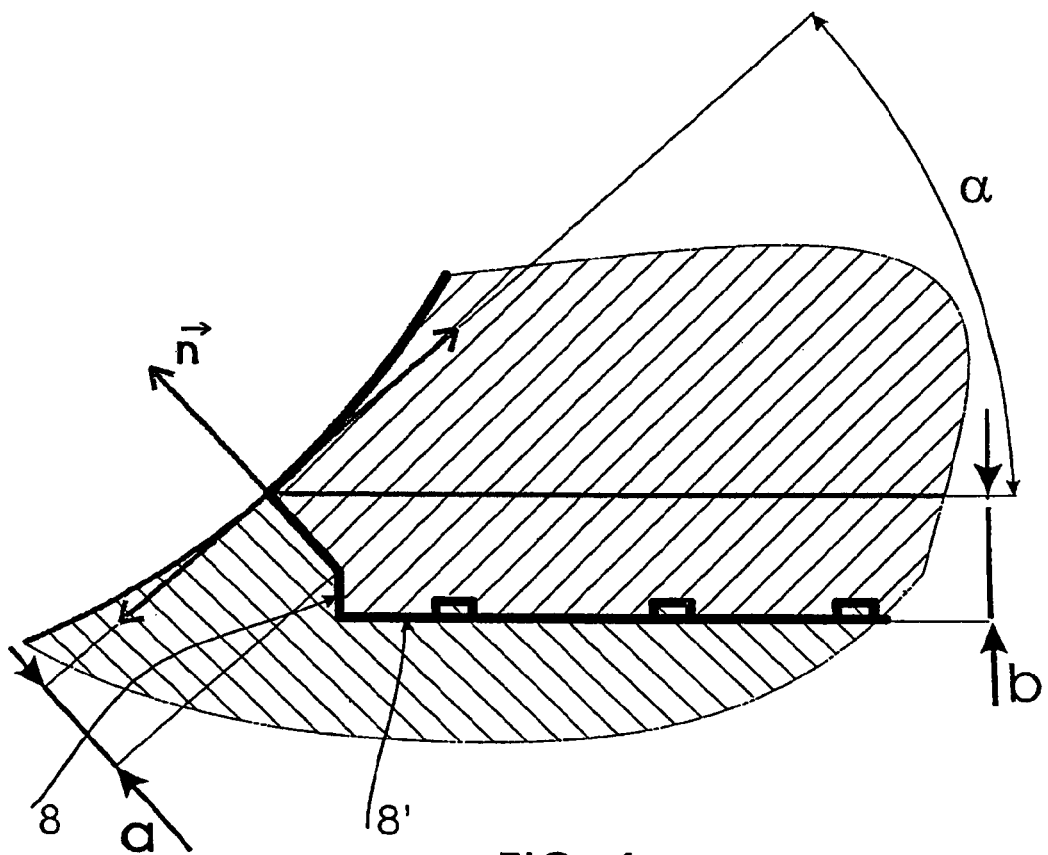

Referring to FIG. 6, and with all other things being equal for the embodiment of FIG. 5, the following are carried out. The amount of material at the joint is controlled (the objective sought). The position of the layer (in X,Y) is controlled by a centering insert (8). The position of the layer (in Z) is controlled by a positioning profile (8'). This also results in control and reinforcement of the assembly and of its mechanical strength.

The positioning profile is calculated relative to the external contour of the layer, and the angle ($\alpha$) is able to vary along this contour. The profile can be obtained by micromilling, by milling the profile, or with a form cutter. In the latter case, the form will be constant on the periphery. The interlock is "hyperstatic", and it is possible to provide clearances for assisting with certain types of contact.

Figure 7:
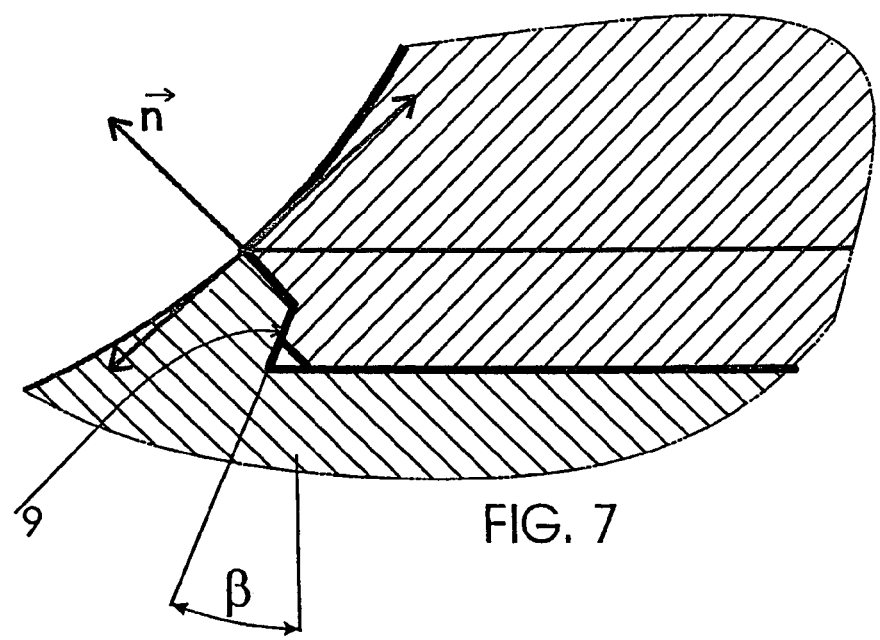
FIGS. 7, 8A, 8B and 8C illustrate simple alternative embodiments.

Various alternatives will now be briefly described. For example, in FIG. 7, the interlock cannot be taken apart due to the presence of an undercut ($\beta$) on the positioning profile (9). Assembly is possible due to the elasticity of the materials.

Figure 8A:
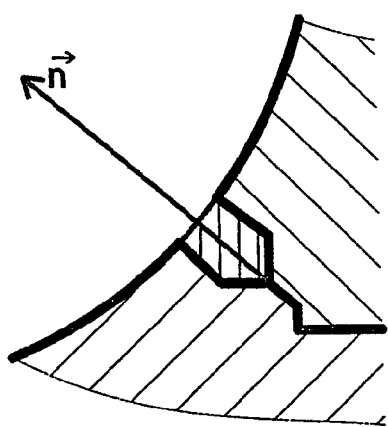
Figure 8B:
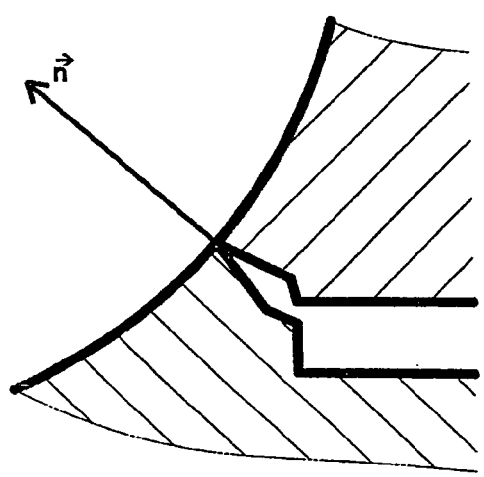
Figure 8C:
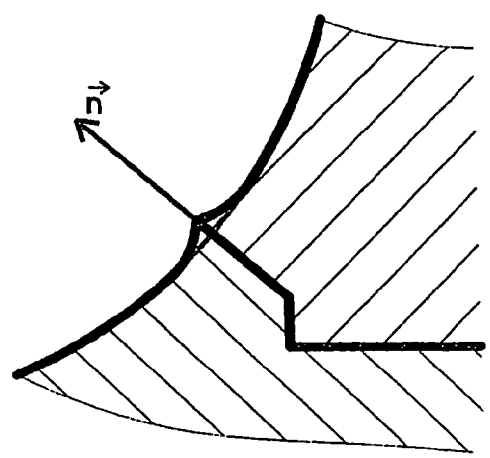

Referring to FIGS. 8A, 8B and 8C, it is also possible to produce an exterior joint as a function of the degree of sealing required. This can be done to make a joint resist, as shown in FIG. 8A, or to add material as a supplement, which results in an external bead by deformation, as shown in FIG. 8B followed by FIG. 8C.

Figure 9:
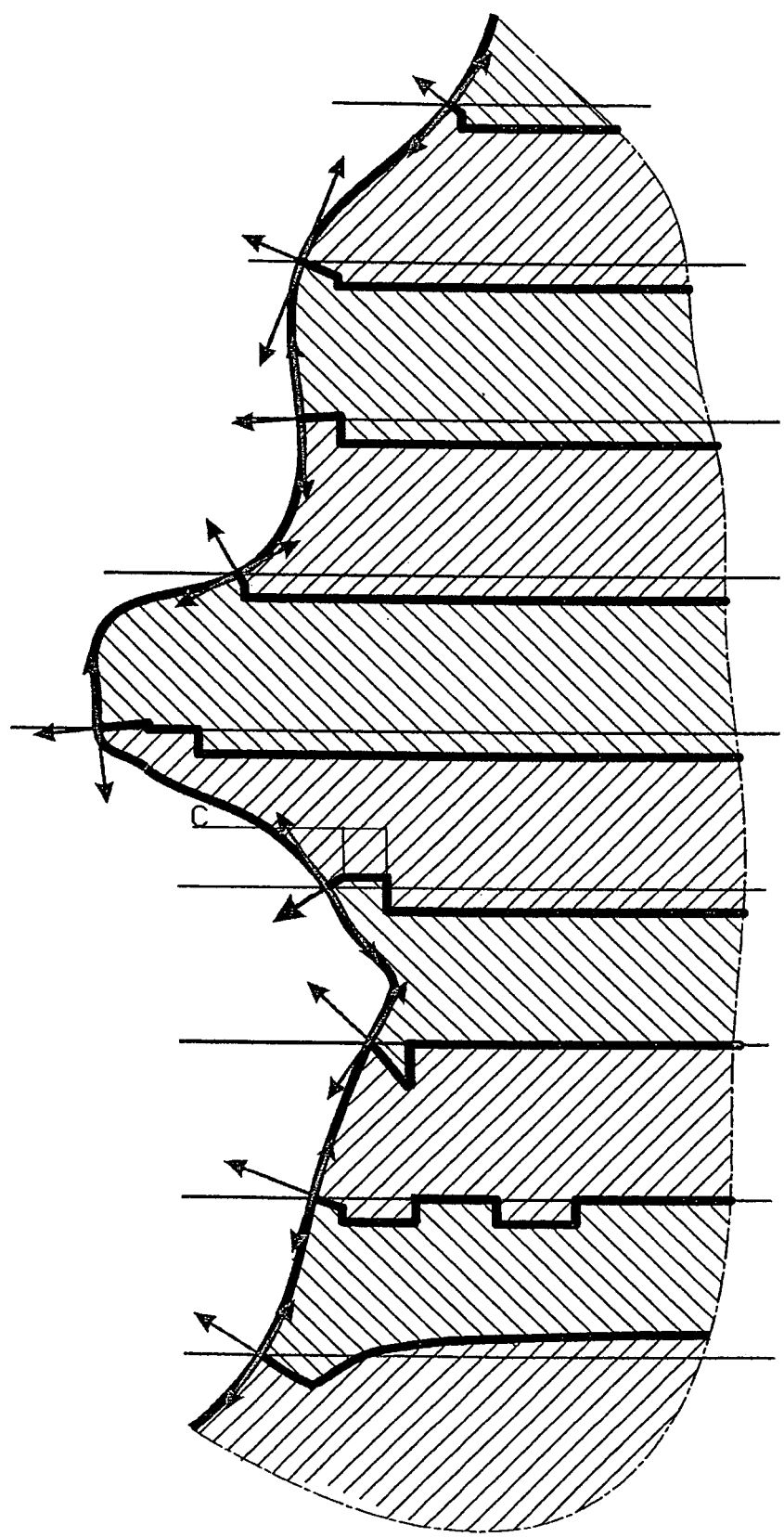
FIG. 9 illustrates an application to overhung and/or undercut profiles.
Figure 10:
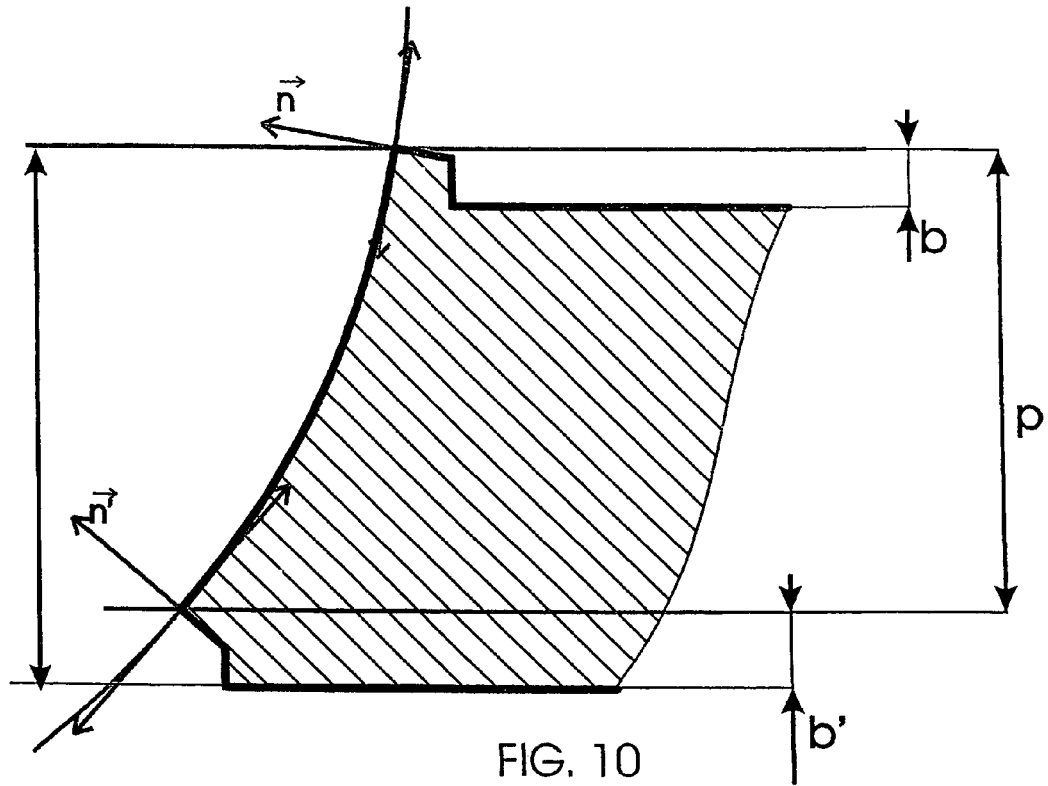
FIG. 10 illustrates a layer of the assembly shown in FIG. 9 in detail.
Figure 11:
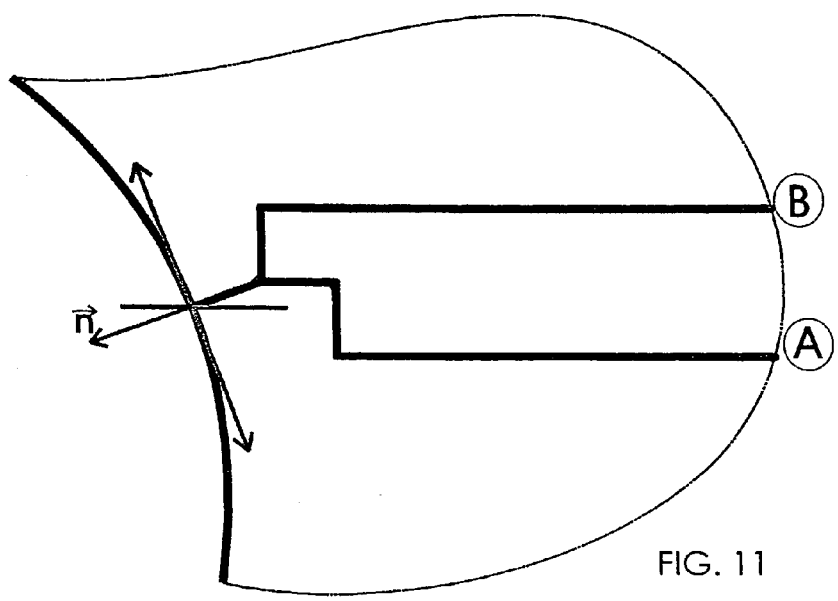
FIG. 11 illustrates a layer of an undercut assembly shown in FIG. 9, showing two alternatives.

FIGS. 9, 10 and 11 show examples of applications to overhangs and undercuts. The detailed views of the layers shown in FIGS. 10 and 11 show that decompositions are possible for overhangs and undercuts, following the foregoing joint principle. It is also possible to choose the side of the interlock (upper or lower layer), and even their combination in space.

Figure 12A:
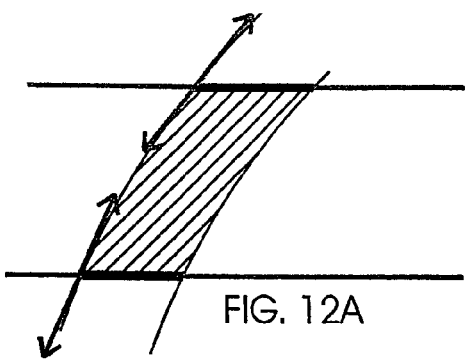
FIGS. 12A to 12F illustrate application of the method of the present invention to a wall.
Figure 12B:
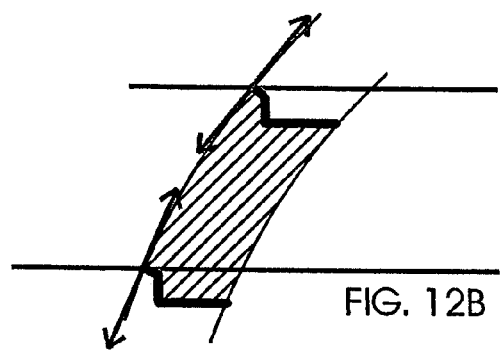
Figure 12E:
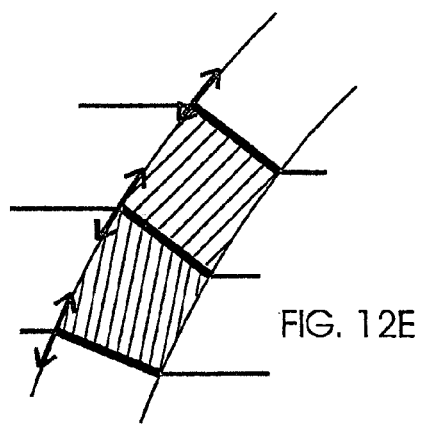
Figure 12C:
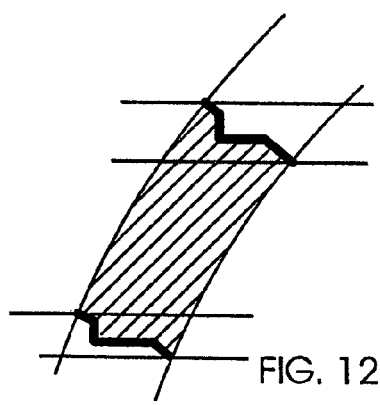
Figure 12F:
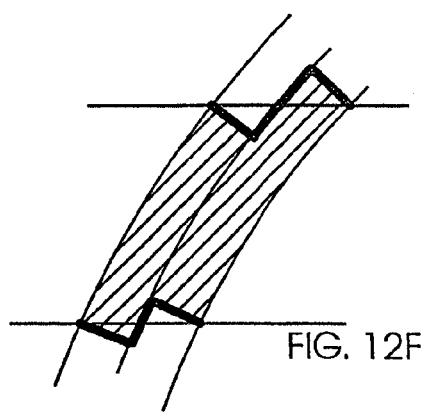
Figure 12D:
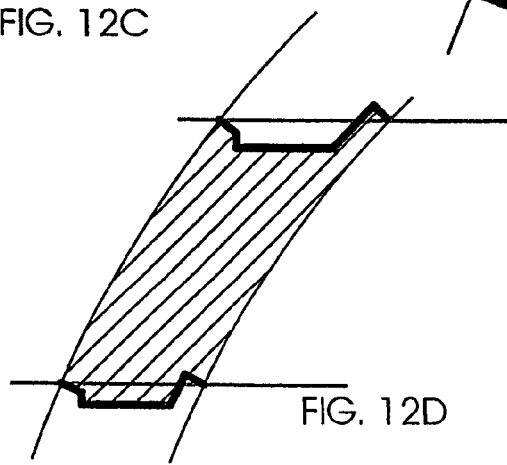

Finally, FIGS. 12A to 12F show various applications of the foregoing method to walls including applications without interlock (FIG. 12A); applications with external interlock only, and flat internal surfaces (FIG. 12B); applications with external and internal interlock, and flat internal surfaces (FIG. 12C); applications with external and internal interlock in the same plane (FIG. 12D); applications with simple normal decomposition (FIG. 12E); and applications with an offset double interlock (FIG. 12F).

From the foregoing, it will be noted that the digitization of the profile makes it possible to obtain a mathematically defined connection and nesting profile, which is functionally programmed. There is no limit to the profiles that can be obtained. The profile can be warped, and the joint surfaces can be complex and calculated.

Figure 1A:
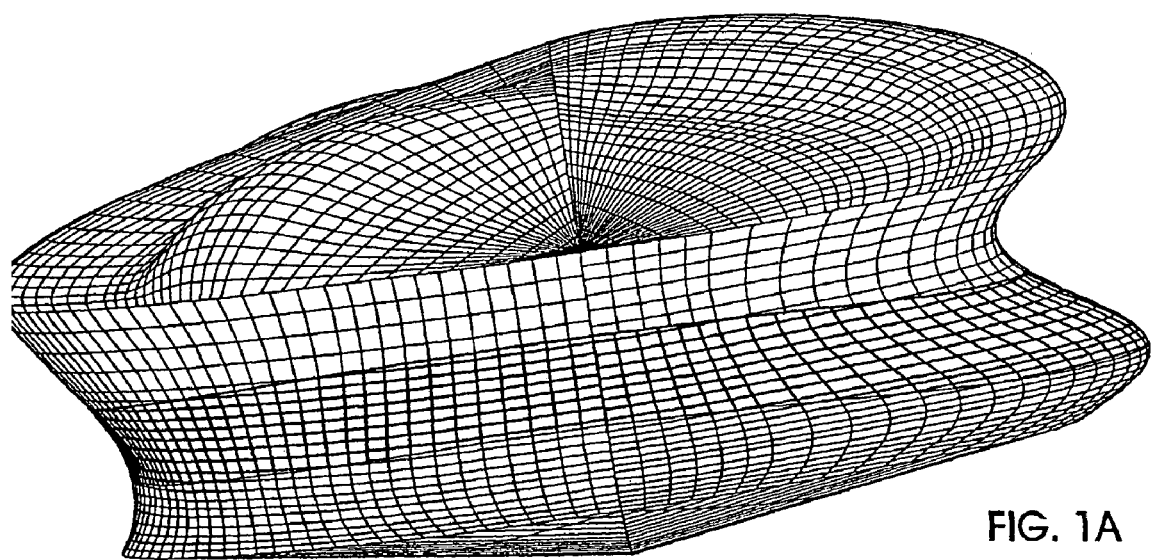
FIG. 1A is a CAD representation of a part that is complicated to produce, with several possible alternative situations.
Figure 1B:
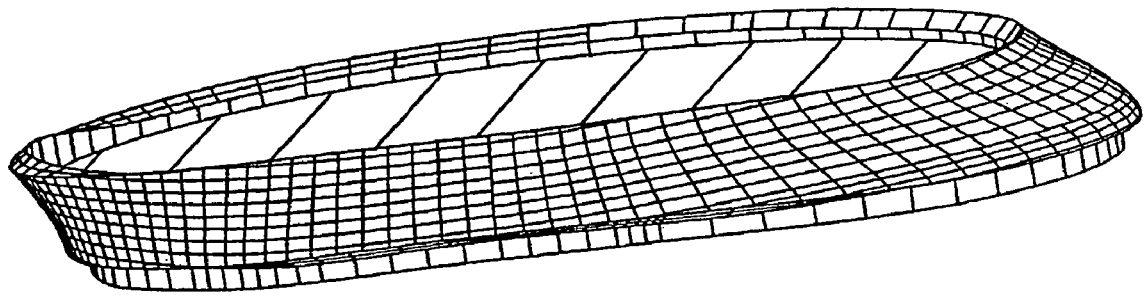
FIG. 1B is a CAD representation of a layer obtained with the method of the present invention, illustrating the layer in three dimensions.
Figure 2B:
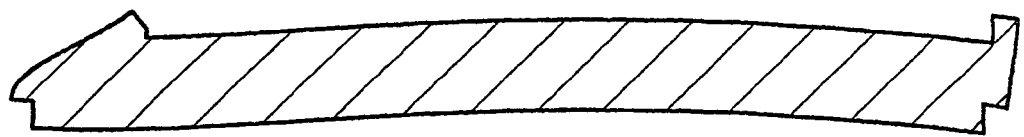
FIGS. 2A and 2B represent a layer obtained in accordance with the present invention, seen from above in FIG. 2A, and in section in FIG. 2B.
Figure 2A:
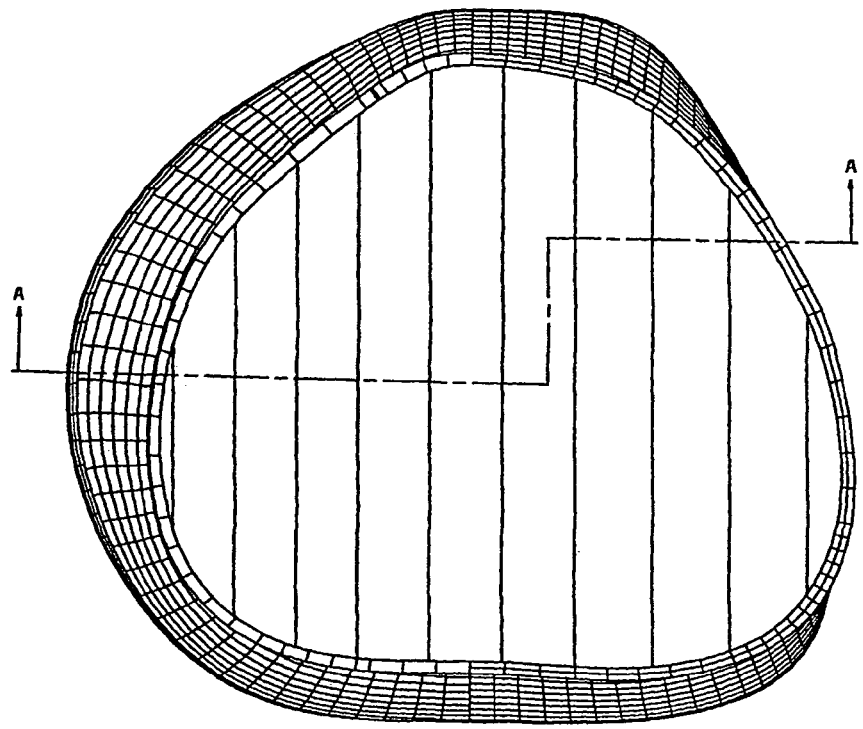

It will be understood that the primary innovation herein lies in the principle of interlocking, the shapes being fully programmed and dependent on the cross-sectional area in which the nesting takes place. This can include flat surfaces, and can also include warped surfaces, as shown in FIGS. 1B, 2A and 2B. By using a geometric algorithm, the shape of the nesting joints is obtained by systematic computer calculation. Consequently, the shape of the joint depends on the layering plane and, therefore, cannot be known in advance.

At the interlocks, it is possible to provide functional portions of the induced functions in the final part. As a nonlimiting example, this can include regulating channels (cooling, heating, etc.) and/or channels for bringing assembly products and/or channels for the circulation of fluids.

The method of the present invention is applicable to all currently known fields involving layered parts designed by rapid prototyping and tooling, and all possible extensions that may later be developed by those skilled in the art for the decomposition of existing parts or for the design of new parts.

The invention claimed is:

1. A method for optimizing a joint between two successive layers of a part obtained by computer-aided modeling or prototyping involving layer decomposition, wherein the method comprises the steps of providing the joint with a connecting profile at end portions of the joint which are flush with surface portions of the part, and forming the connecting profile of the joint so that the connecting profile is always substantially normal to a plane tangential to the surface portions of the part at the end portions of the joint, and so that at least portions of the connecting profile form an angle relative to a plane defined by the joint, wherein the angle varies along the connecting profile of the joint.

2. The method of claim 1 which further includes the step of mathematically and numerically defining the connecting profile of the joint of the two successive layers using an algorithm which places the connecting profile at the end portions of the joint which are flush with the surface portions of the part substantially normal to the plane tangential to the surface portions of the part at the end portions of the joint and so that the portions of the connecting profile form the angle relative to the plane defined by the joint.

3. The method of claim 1 wherein the line of the connecting profile of the joint between the two successive layers varies along peripheral portions of the part.

4. The method of claim 1 which further includes the step of forming an interlock on the joint between the two successive layers.

5. The method of claim 4 which further includes the step of forming an undercut on a positioning profile associated with the joint, adjacent to the connecting profile, preventing separation of the two successive layers.

6. The method of claim 1 which further includes the step of forming the joint with additional material located between the two successive layers.

7. The method of claim 6 wherein the additional material forms a supplement portion on the joint.

8. The method of claim 6 wherein the additional material forms a resist portion on the joint.

9. The method of claim 1 which further includes the step of adapting the connecting profile to surface portions of the part having overhangs and undercuts.

10. The method of claim 1 which further includes the step of controlling relative positioning of the two successive layers, including providing a centering insert between the two successive layers for controlling the positioning in (X,Y) and providing a positioning profile between the two successive layers for controlling the positioning in (Z).

11. The method of claim 1 which further includes the step of forming a hyperstatic interlock on the joint.

12. The method of claim 1
wherein an included angle is formed between the plane tangential to the surface portions of the part and the plane defined by the joint, and wherein the included angle varies along the connecting profile of the joint.

13. The method of claim 1 which further includes the step of forming the connecting profile at an incline to the plane defined by the joint.

14. The method of claim 1 which further includes the step of providing the joint with an offset relative to the connecting profile at the end portions of the joint which are flush with the surface portions of the part.

15. The method of claim 1 which further includes the step of forming at least portions of the connecting profile between the plane defined by the joint and the surface portions of the part at the angle relative to the plane defined by the joint.

16. The method of claim 1
wherein the surface portions of the part include contoured surface portions.

17. A method for optimizing a joint between two successive, substantially parallel plates of a part obtained by computer-aided modeling or prototyping involving layer decomposition, wherein the method comprises the steps of providing the joint with a connecting profile at end portions of the joint which are flush with surface portions of the part, and forming the connecting profile of the joint so that the connecting profile is always substantially normal to a plane tangential to the surface portions of the part at the end portions of the joint, and so that at least portions of the connecting profile form an angle relative to a plane defined by the joint, wherein the angle varies along the connecting profile of the joint.

18. The method of claim 17 which further includes the step of mathematically and numerically defining the connecting profile of the joint of the two successive plates using an algorithm which places the connecting profile at the end portions of the joint which are flush with the surface portions of the part substantially normal to the plane tangential to the surface portions of the part at the end portions of the joint and so that the portions of the connecting profile form the angle relative to the plane defined by the joint.

19. The method of claim 17 wherein the line of the connecting profile of the joint between the two successive plates varies along peripheral portions of the part.

20. The method of claim 17 which further includes the step of forming an interlock on the joint between the two successive plates.

21. The method of claim 20 which further includes the step of forming an undercut on a positioning profile associated with the joint, adjacent to the connecting profile, preventing separation of the two successive plates.

22. The method of claim 17 which further includes the step of forming the joint with additional material located between the two successive plates.

23. The method of claim 22 wherein the additional material forms a supplement portion on the joint.

24. The method of claim 22 wherein the additional material forms a resist portion on the joint.

25. The method of claim 17 which further includes the step of adapting the connecting profile to surface portions of the part having overhangs and undercuts.

26. The method of claim 17 which further includes the step of controlling relative positioning of the two successive plates, including providing a centering insert between the two successive plates for controlling the positioning in (X,Y) and providing a positioning profile between the two successive plates for controlling the positioning in (Z).

27. The method of claim 17 which further includes the step of forming a hyperstatic interlock on the joint.

28. The method of claim 17 wherein an included angle is formed between the plane tangential to the surface portions of the part and the plane defined by the joint, and wherein the included angle varies along the connecting profile of the joint.

29. The method of claim 17 which further includes the step of forming the connecting profile at an incline to the plane defined by the joint.

30. The method of claim 17 which further includes the step of providing the joint with an offset relative to the connecting profile at the end portions of the joint which are flush with the surface portions of the part.

31. The method of claim 17 which further includes the step of forming at least portions of the connecting profile between the plane defined by the joint and the surface portions of the part at the angle relative to the plane defined by the joint.

32. The method of claim 17 wherein the surface portions of the part include contoured surface portions.

* * * * *